United States Patent
Ichimaru

(10) Patent No.: US 6,412,788 B1
(45) Date of Patent: Jul. 2, 2002

(54) SUSPENSION CONTROL SYSTEM

(75) Inventor: Nobuyuki Ichimaru, Kanagawa-ken (JP)

(73) Assignee: Tokico Ltd., Kawasaki (JP)

( * ) Notice: Subject to any disclaimer, the term of this patent is extended or adjusted under 35 U.S.C. 154(b) by 0 days.

(21) Appl. No.: 09/538,896

(22) Filed: Mar. 30, 2000

(30) Foreign Application Priority Data

Mar. 31, 1999 (JP) .......................................... 11-092719

(51) Int. Cl.⁷ ............................................. B60G 17/015
(52) U.S. Cl. ............................... 280/5.519; 280/5.515; 701/37
(58) Field of Search ........................... 280/5.515, 5.519; 701/37

(56) References Cited

U.S. PATENT DOCUMENTS

| | | | |
|---|---|---|---|
| 4,600,215 A | * 7/1986 | Kuroki et al. | 280/5.519 |
| 4,629,212 A | * 12/1986 | Takizawa et al. | 280/5.519 |
| 4,648,622 A | * 3/1987 | Wada et al. | 280/5.519 |
| 4,765,648 A | * 8/1988 | Mander et al. | 280/5.519 |
| 4,967,359 A | * 10/1990 | Sugasawa et al. | 280/5.519 |
| 5,015,007 A | * 5/1991 | Uchiyama et al. | 280/5.515 |
| 5,101,355 A | * 3/1992 | Wada et al. | 280/5.519 |
| 5,162,996 A | * 11/1992 | Matsumoto et al. | 280/5.519 |
| 5,173,858 A | * 12/1992 | Wada et al. | 701/37 |
| 5,203,584 A | * 4/1993 | Butsuen et al. | 280/5.519 |
| 5,375,872 A | * 12/1994 | Ohtagaki et al. | 280/5.515 |
| 6,176,994 B1 | 1/2001 | Ichimaru et al. | 280/5.515 |

FOREIGN PATENT DOCUMENTS

| | | | |
|---|---|---|---|
| JP | 04215515 A | * | 8/1992 |
| JP | 5155216 A | | 6/1993 |

* cited by examiner

Primary Examiner—Lanna Mai
Assistant Examiner—Ruth Ilan
(74) Attorney, Agent, or Firm—Wenderoth, Lind & Ponack, L.L.P.

(57) ABSTRACT

A suspension control system includes a shock absorber adapted to be mounted between a vehicle body and a wheel axle and having a variable damping force, an actuator operatively connected to the shock absorber and adapted to adjust the damping force developed by the shock absorber, an accelerometer for detecting terrain conditions and outputting a corresponding terrain condition signal, and a controller including a detector for determining terrain conditions in response to the frequency of the terrain condition signal and adapted to control the actuator in response to the terrain conditions as determined. The controller is operable to increase the damping force by a predetermined amount over a predetermined period of time when the accelerometer determines that the terrain includes a bump.

6 Claims, 12 Drawing Sheets

SUSPENSION CONTROL SYSTEM

BACKGROUND OF THE INVENTION

The present invention relates to a suspension control system designed to limit motion of a vehicle body above a spring so as to improve ride quality.

RELATED ART

One such suspension control system is disclosed in Japanese patent application No. 9-367760 filed by the applicant of the present application. In this system, accelerometers, level sensors and other sensors are employed to determine terrain conditions, such as bumpy terrain and rough terrain, and to achieve control over dampening performance in response to the terrain conditions.

Terrain conditions are generally classified into smooth terrain, bumpy terrain and rough terrain as shown in TABLE 1. One type of the bumpy terrain (conveniently, referred to as "gradual bump") has a wavy section as shown in FIG. 10($a$). The other type is directed to independent or intentional steep bumps as shown in FIG. 10($b$). Such steep bumps (or depressions) may appear in substantially a periodic manner and may have a height of 10 cm to 20 cm and a length of 30 cm to 4 m.

that a higher gain needs be set (that is, a larger damping force is required) when the vehicle passes over a steep bump rather than a gradual bump. However, such a high gain degrades ride quality when the vehicle passes over a gradual bump.

When the vehicle passes over a steep bump, the suspension is susceptible to full rebound and full bumping. To prevent this, it is desirable to increase the amount of dampening. However, such an increase in the amount of dampening results in poor ride quality when the vehicle travels on smooth terrain.

In view of the foregoing, it is an object of the present invention to provide a suspension control system which can more appropriately adjust the amount of dampening in response to terrain conditions.

It is another object of the present invention to provide a suspension control system which can provide high ride quality when a vehicle passes over a steep bump.

SUMMARY OF THE INVENTION

In order to achieve the foregoing objects, the present invention provides a suspension control system comprising a shock absorber adapted to be mounted between a vehicle body and a wheel axle and having a variable damping force, an actuator operatively connected to the shock absorber and

TABLE 1

| | | | AMPLITUDE OF VERTICAL ACCELERATION | | FREQUENCY OF VERTICAL ACCELERATION |
|---|---|---|---|---|---|
| BUMPY TERRAIN | STEEP BUMP | MEDIUM TO LARGE | MEDIAN BETWEEN MEDIUM AND LARGE TO LARGE | 0.3 G OR GREATER AT 50 Km/h or less | LOW (e.g., 2 Hz OR LOWER) |
| | GRADUAL BUMP | | MEDIUM TO MEDIAN BETWEEN MEDIUM AND LARGE | 0.15–0.2 G OR GREATER (0.3 G OR LESS) | |
| ROUGH TERRAIN | | | SMALL TO LARGE | | HIGH (e.g., 5 Hz TO 6 Hz OR HIGHER) |
| SMOOTH TERRAIN | | OTHER THAN THE ABOVE | | | |

In TABLE 1, the expression "median between medium and large" is intended to mean median value between medium and large amplitudes.

In the system disclosed in that application, terrain conditions are determined so as to adjust dampening performance in response to the terrain conditions. However, such adjustment is not satisfactory since no consideration is given to time. Where intentional bumps have a fixed distance or length, it is only necessary to vary the amount of dampening in response to the terrain conditions while the bumps continue. In the disclosed system, it is necessary to determine terrain conditions in each control cycle so as to adjust the dampening performance. This approach is cumbersome and is unable to provide an adequate degree of control over the dampening performance.

Typically, when a vehicle passes over a steep bump, it travels at a low speed since such a steep bump has a height of, for example, 10 cm to 20 cm. At that time, a part of the vehicle body above a spring is subjected to substantial heave movement. When the vehicle travels on bumpy terrain, the disclosed system is designed to set a high gain and constantly develop a large damping force. It is to be understood rendered operative to adjust the damping force developed by the shock absorber, means for detecting terrain conditions and developing a corresponding terrain condition signal having a frequency, and a controller including means for determining terrain conditions in response to the frequency of the terrain condition signal and adapted to control the actuator in response to the terrain conditions as determined by the means for determining terrain conditions, wherein the controller is operable to increase the damping force by a predetermined amount over a predetermined period of time when the means for determining terrain conditions determines that terrain includes a bump.

According to the present invention, when it is determined that terrain includes a bump, a damping force is increased by a predetermined amount. This ensures proper control over dampening performance. Also, this control is effected within a predetermined time period. This retards deterioration in ride quality which may occur as the damping force is increased and thus, achieves more appropriate control over dampening performance. Further, a reduction in time period during which an increased damping force is applied leads to longer life of the shock absorber and better ride quality.

In one embodiment, a vehicle speed sensor is connected to the controller so as to detect vehicle speed. The controller is operable to vary at least either the applied amount or time of a damping force when the terrain condition determination means determines that terrain includes a bump. This control accommodates a change in vehicle motion in response to vehicle speed. Thus, the system is capable of achieving improved and accurate control over dampening performance in response to vehicle speed.

It is preferable to increase a damping force by an amount greater than the predetermined amount in the event that the terrain condition signal has a low frequency and has an amplitude greater than a predetermined level. This retards full rebound and full bumping when (low frequency) terrain includes steep bumps.

In another embodiment, a vehicle speed sensor is connected to the controller so as to detect vehicle speed. When it is determined that the terrain condition signal has a low frequency and has an amplitude greater than a predetermined level, the controller is operable to vary at least either the applied amount or time of a damping force in response to vehicle speed. This control retards full rebound and full bumping when the vehicle passes over a steep bump and accommodates a change in vehicle motion in response to vehicle speed. Thus, the system is capable of achieving improved and accurate control over dampening performance in response to vehicle speed.

BRIEF DESCRIPTION OF THE DRAWINGS

The above and other objects, features and advantages of the present invention will become apparent from the following description of preferred embodiments when taken in conjunction with the accompanying drawings, in which.

DESCRIPTION OF THE PREFERRED EMBODIMENTS

Figure 1:
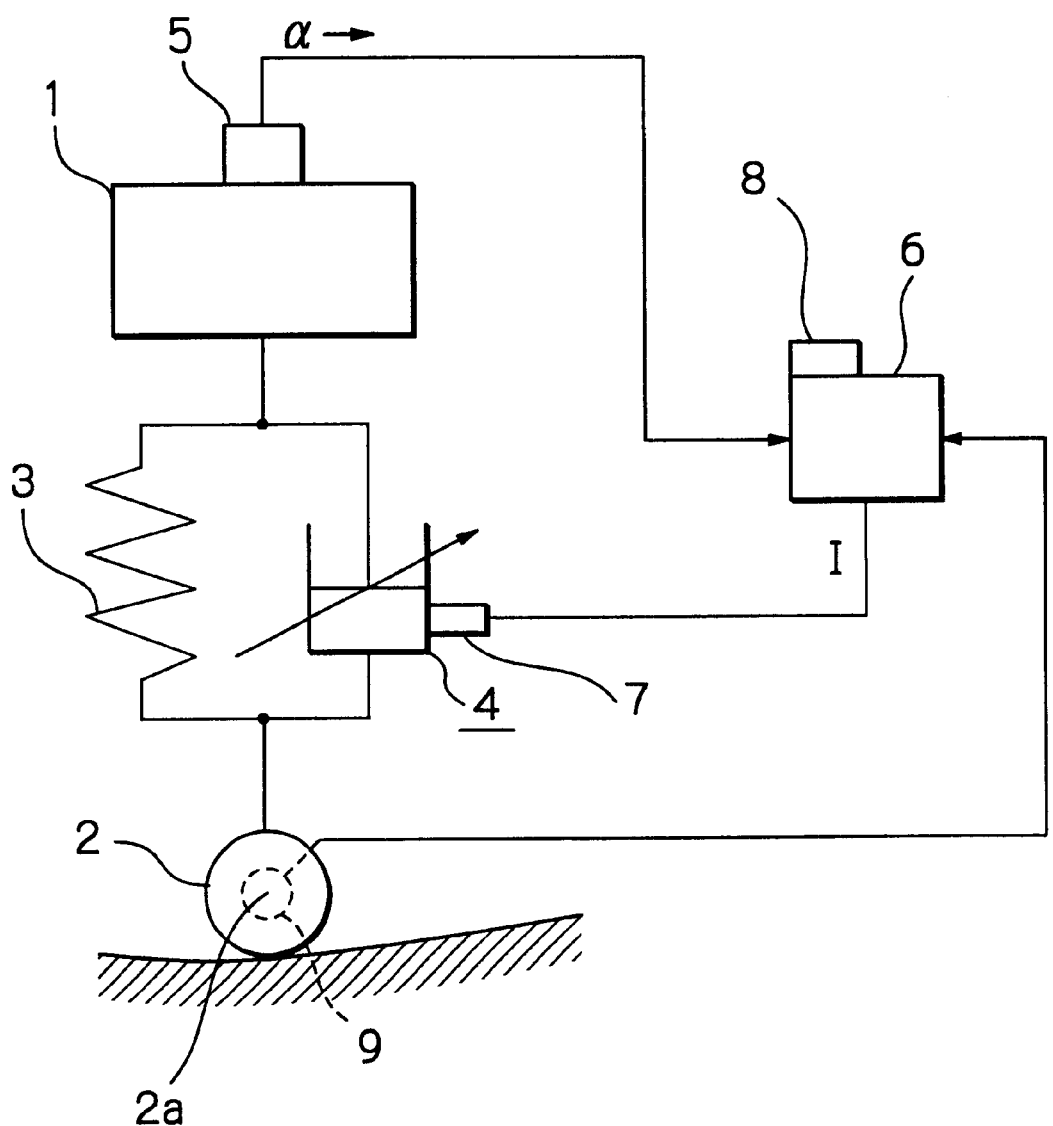
FIG. 1 is a schematic view of a suspension control system according to a first embodiment of the present invention.

Referring to FIGS. 1 to 5, there is illustrated a suspension control system according to a first embodiment of the present invention. In FIG. 1, a vehicle includes a vehicle body 1, four wheels 2 (only one is shown in this figure) with associated wheel axles 2a. A spring 3 and a shock absorber 4 with a variable damping force are disposed in parallel between the vehicle body 1 and the wheels 2 to support the vehicle body 1. An accelerometer 5 (terrain sensor means) is mounted to the vehicle body 1 to detect vertical acceleration of the vehicle body 1 and send an acceleration signal α to a controller 6. Four shock absorbers 4 and four springs 3 are mounted to the four wheels 2, but only one of each of which is shown for purposes of illustration.

An actuator 7 is associated with the shock absorber 4. The actuator 7 is operable to receive a control signal I from the controller 6 and actuate a damper mechanism, not shown, arranged in the shock absorber 4 so as to cause the damper mechanism to develop and adjust a damping force in response to the control signal.

The controller 6 is operable to develop the control signal I in response to the acceleration signal α sent from the accelerometer 5. The control signal I is then sent to the actuator 7. More specifically, the controller 6 includes information on the relationship between dampening performance of the shock absorber 4 and the control signal I. When the control signal I is sent to the actuator 7, then the actuator 7 is operable to adjust the amount of dampening in extension and compression (for example, hard in extension/soft in compression, soft in extension/soft in compression, or soft in extension/hard in compression) in response to the control signal I.

Figure 2:
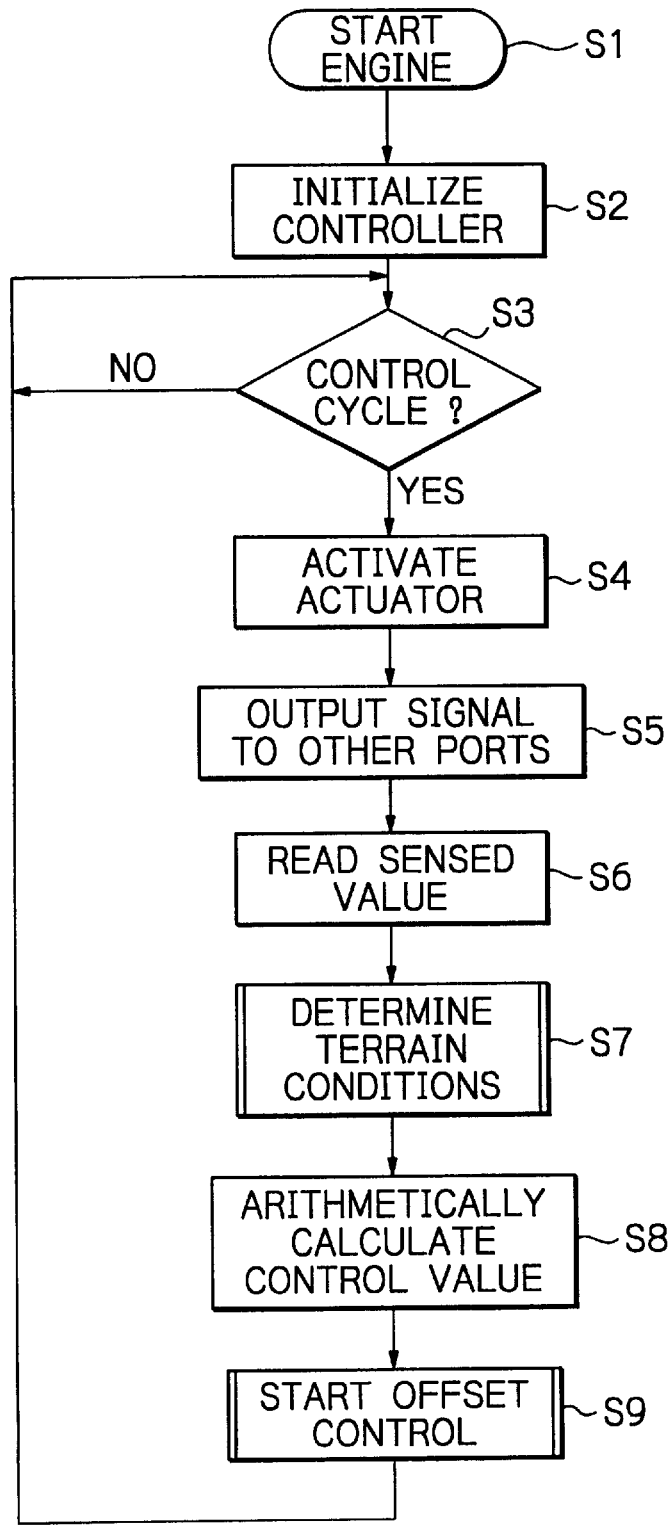
FIG. 2 is a flowchart showing the main program run by a controller shown in FIG. 1.
Figure 3:
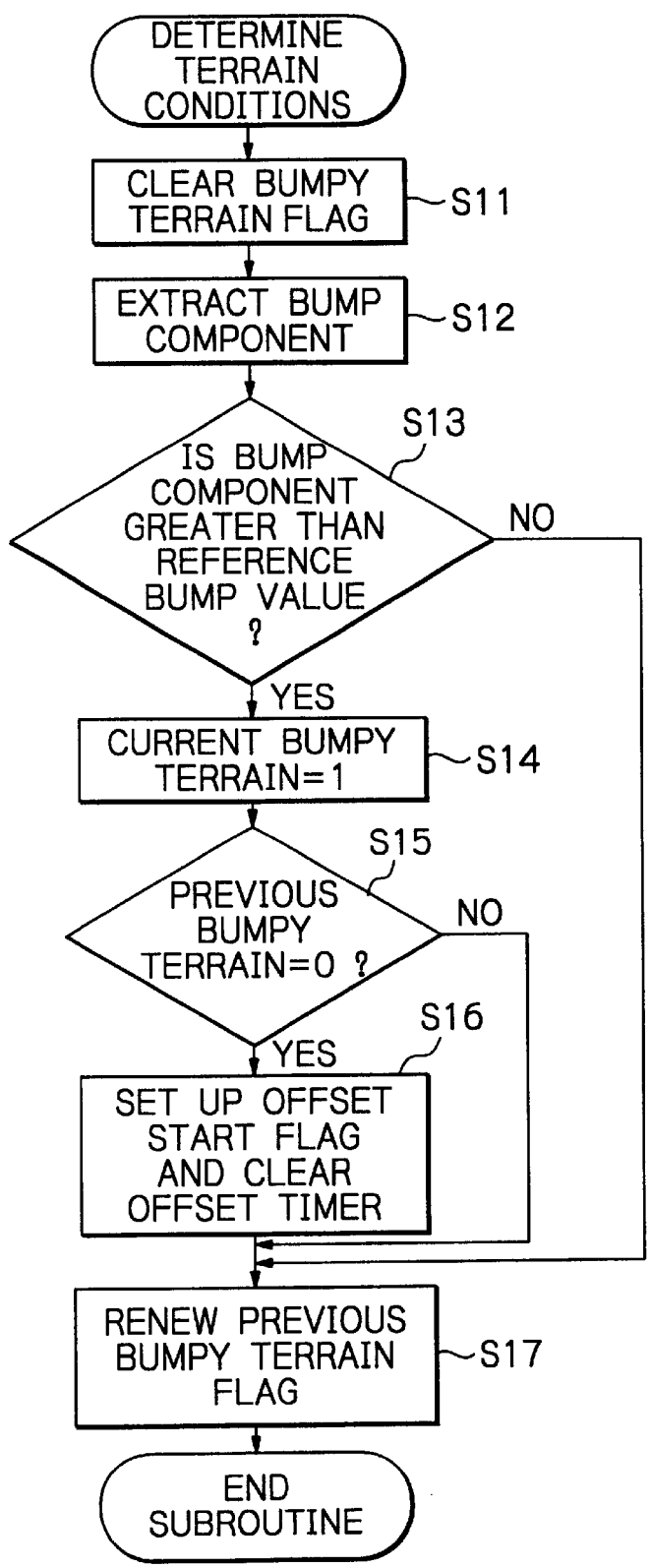
FIG. 3 is a flowchart showing a subroutine for determining terrain conditions included in the main program shown in FIG. 2.
Figure 4:
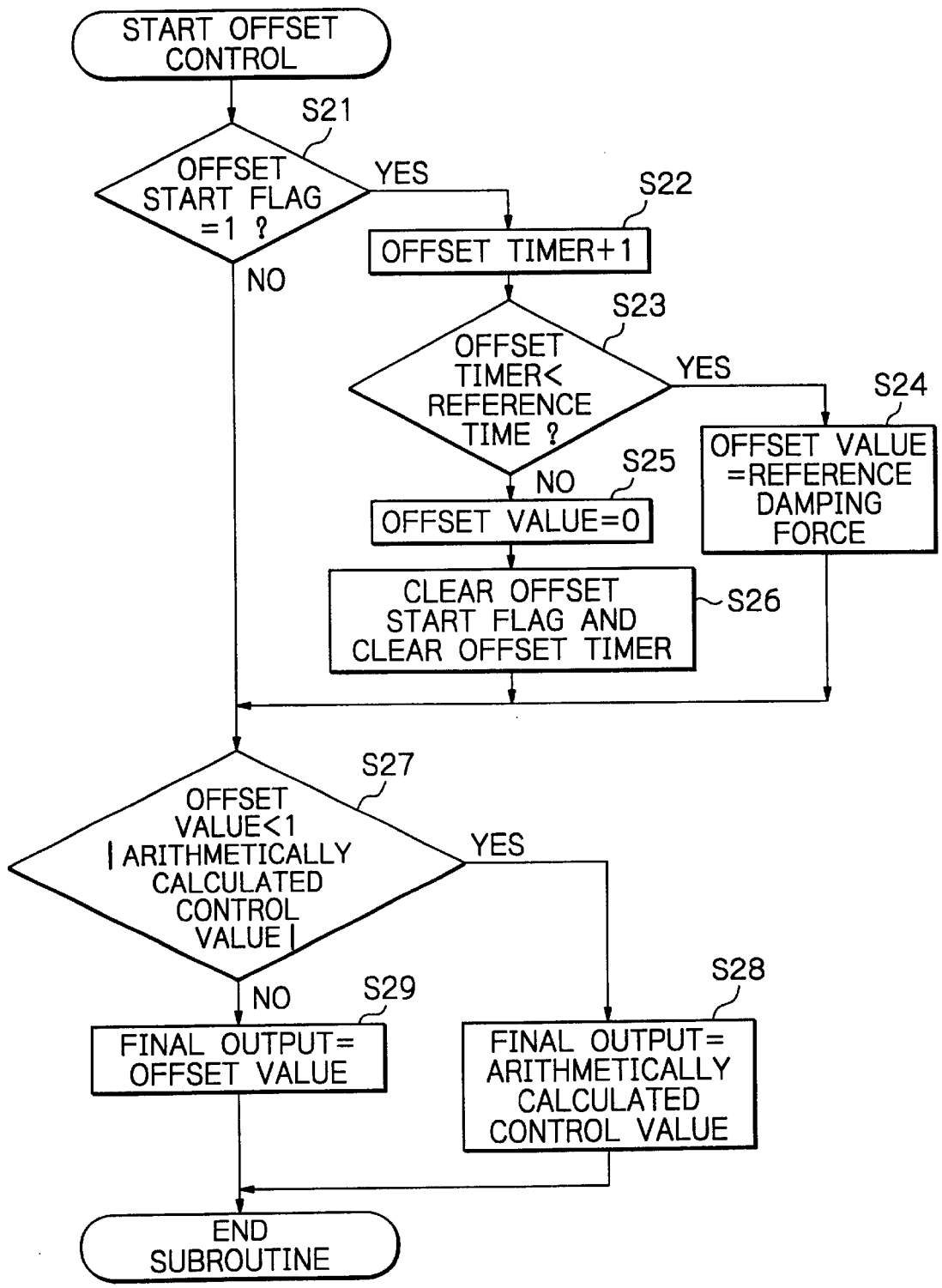
FIG. 4 is a flowchart showing a subroutine for effecting offset control included in the main program shown in FIG. 2.

Reference will now be made to FIGS. 2 to 4 wherein arithmetic control is performed by the controller 6. As shown in FIG. 2, power is supplied to the controller 6 when the engine of the vehicle starts (step S1). After the controller 6 is initialized (step S2), a determination is made as to whether the program enters a control cycle (step S3). This determination continues until the program enters the control cycle. When the program enters the control cycle, the actuator 7 is activated based on the output of a previous control cycle (step S4). The program then proceeds to step S5 where the controller outputs a control signal to components (such as LED) other than the actuator 7. Thereafter, the acceleration signal a is read from the accelerometer 5 (step S6). A terrain condition determination unit 8 is operable to determine terrain conditions based on the acceleration signal a as read in Step S6 and provides control parameters (step S7). The amount of dampening required to isolate the vehicle body 1 from shock is obtained based on the result given in step S7. To develop the required dampening, the control signal (electric current) I to be sent to the actuator 7 is produced (step S8). In step S9, a minimum damping force (offset control) is calculated based on the terrain conditions as determined in step S7 and the result of arithmetic calculation as obtained in step S8.

Reference will next be made to FIG. 3 wherein a subroutine for step S7 is illustrated. In step S11, a bumpy terrain flag is cleared. A bump component is then extracted (step S12). Specifically, the acceleration signal α is filtered through a low-pass filter (LPF) so as to extract a low frequency (see bump component shown in TABLE 1). Step S13 is subsequently executed to determine whether the value of amplitude in the bump component as extracted in step S12 is greater than a reference bump value. If the answer to this question is "YES" (that is, when the amplitude is greater than the reference value), the program proceeds to step S14 where a current bumpy terrain flag is set at 1. Following step S14, a determination is made as to whether a previous bumpy terrain flag is zero (step S15). If the answer to this question is "YES" (that is, when the previous bumpy terrain flag is zero), an offset start flag (offset control start flag) is set, and an offset timer (offset control time timer) is cleared (step S16). Following step S16, the previous bumpy terrain flag is renewed (step S17). This completes the terrain condition determination subroutine, and the program returns to the main routine shown in FIG. 2.

If the answer to the question in step S13 is "NO", or the answer to the question in step S15 is "NO", the program proceeds to step S17. As explained above, steps S13 to S16 are executed to determine whether the vehicle enters bumpy terrain. When the vehicle enters bumpy terrain, time measurement is initiated.

Figure 5:
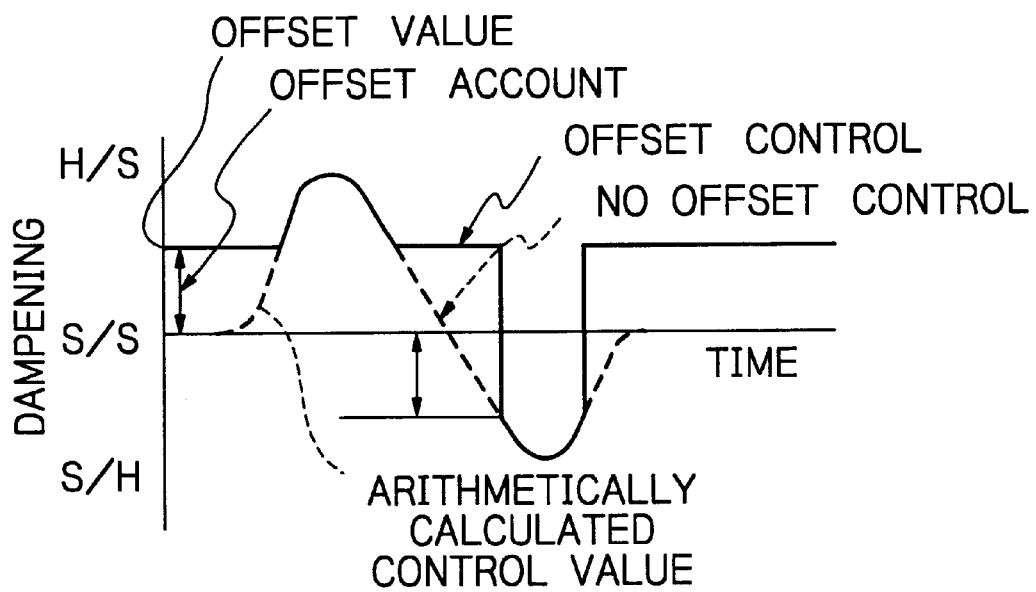
FIG. 5 is a view illustrating the operation of the offset control subrouting shown in FIG. 4.

Reference will now be made to FIG. 4 wherein an offset control subroutine for step S9 is illustrated. A determination is first made as to whether the offset start flag (step S16) is "1" (step S21). If the answer to this question is "YES" (that is, when the offset start flag is 1), the offset timer is set at 1 (incremented by "1") (in step S23). A determination is then made as to whether the value of the offset timer is less than a predetermined reference time (step S23). The reference time is determined based, for example, on vehicle speed when the vehicle passes over a bump and the distance of the bump. If the answer to the question in step S23 is "YES" (that is, when the value of the offset timer is less than the value of the reference time), a dampening offset value (hereinafter, referred to as "offset value"), such as shown in FIG. 5, as a minimum damping force (minimum damping value) required to isolate the vehicle body 1 from shock during travel on bumpy terrain is used as a reference damping force (step S24). If the answer to the question in step S23 is "NO" (that is, when the value of the offset timer is greater than the value of the reference time), then the offset start flag and the offset timer are both cleared (step S25 and step S26).

If the answer to the question in step S21 is "NO", if step S24 is executed, or if step S26 is executed, a determination is made as to whether the offset value is greater than the absolute value of an arithmetically calculated control value (step S27). It should be understood that the arithmetically calculated control value used in step S27 is the desired damping force and corresponds to the control signal I (see step S8) as developed in real time based on the acceleration signal α sent from the accelerometer 5. This arithmetically calculated control value is shown for example, by dotted line in FIG. 5. If the answer to the question in step S27 is "YES" (that is, when the offset value is less than the absolute value of an arithmetically calculated control value), then a final output in the form of the control signal I sent to the actuator 7 is made equal to the arithmetically calculated control value (arithmetically calculated real time control value) (step S28). If the answer to the question instep S27 is "NO" (that is, the offset value is greater than the absolute value of an arithmetically calculated control value), then such a final output is made equal to the offset value (step S29). The offset control subroutine is completed when step S28 or step S29 have been executed. Then, the program returns to the main routine shown in FIG. 2.

With the suspension control system thus far described, when a vehicle passes over a bump, it is determined in step S13 that the amplitude in the bumpy component is greater than the reference value ("YES"). It is then determined in step S15 that a previous bumpy terrain flag is zero ("YES"). Thereafter, the offset start flag is set (step S16) so as to effect offset control shown in FIG. 4. As the offset control is initiated, the offset timer is rendered operative to measure time (step S22). The offset value (see FIG. 5) is used as a reference damping force until the value of the offset timer reaches the reference time (corresponding to the time required for the vehicle to pass over a bump) (that is, until the step S23 is answered in the positive). A determination is then made as to whether the offset value is less than the absolute value of the arithmetically calculated control value (step S27). If, for example, the offset value is equal to or greater than the absolute value of the arithmetically calculated control value (shown by dotted line in FIG. 5) as obtained in real time based on the acceleration signal α (that is, when the question in step S27 is answered in the negative), the offset value rather than the arithmetically calculated control value shown by dotted line in FIG. 5 is used as a final output in the form of the control signal I sent to the actuator 7 so as to ensure proper dampening. If, on the other hand, the offset value is less than the absolute value of the arithmetically calculated control value (shown by dotted line in FIG. 5) (see curved portion of the arithmetically calculated control value shown in FIG. 5), the step S27 is answered in the positive. In this instance, the arithmetically calculated control value shown by dotted line in FIG. 5 (step S28) is used as a final output so as to ensure proper dampening. The offset value is used as a reference damping force (step S24) until step S23 is answered in the negative (that is, until the reference time is reached after the vehicle enters a bump). When step S23 is answered in the negative, the offset value is set at "0" (step S25). When step S27 is answered in the positive, the arithmetically calculated control value is used as a final output sent to the actuator 7 (step S28) so as to ensure proper dampening.

As described above, when the vehicle passes over a bump (step S13 to S16), at least the offset value or reference damping force is used as a final output (When "offset control" is effected as shown in FIG. 5, the final output is not less than the offset value). This control ensures proper dampening when the vehicle passes over a bump. Also, this final output is available only within a predetermined time period (or reference time). This is made possible by setting the offset value at "0" when the step S23 (a determination as to whether the offset timer value is less than the reference time) is answered in the negative (step S25). This control minimizes deterioration in ride quality which may occur as a damping force increases and thus, achieves control over dampening performance.

Figure 6:
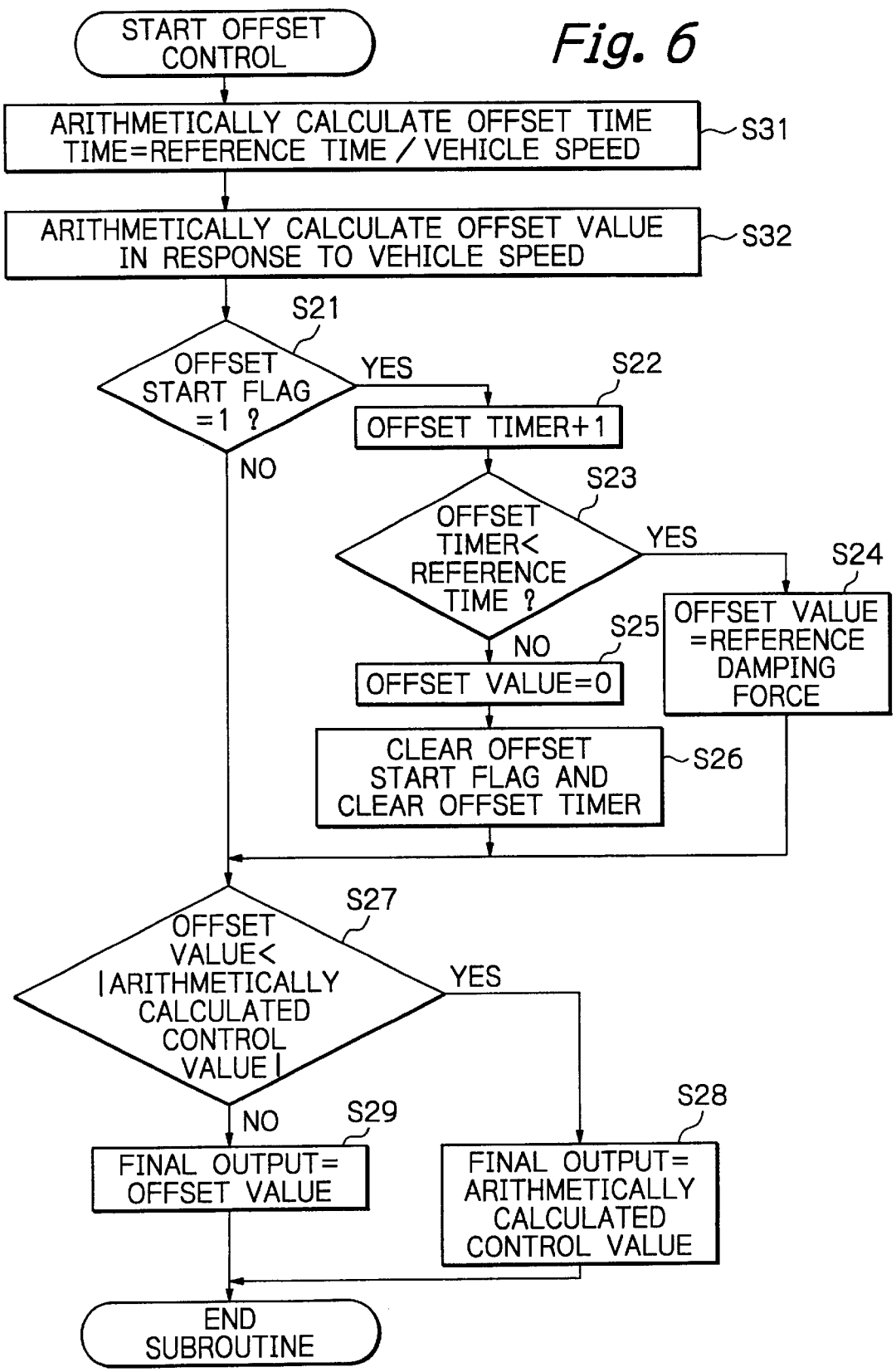
FIG. 6 is a flowchart showing another form of the offset control subrouting shown in FIG. 4 (second embodiment of the present invention)

The offset control subroutine shown in FIG. 4 and included in step S9 shown in FIG. 2 may be replaced by that shown in FIG. 6. In an offset control subroutine (For purposes of illustration, a suspension control system that executes this subroutine will be referred to as a "second embodiment") shown in FIG. 6, a vehicle speed signal is used to determine an offset time and an offset value for offset control. The second embodiment of the suspension control system includes a vehicle speed sensor 9 as a means for detecting vehicle speed. The vehicle speed sensor 9 is operable to detect vehicle speed and develop a corresponding vehicle speed signal.

Figure 7:
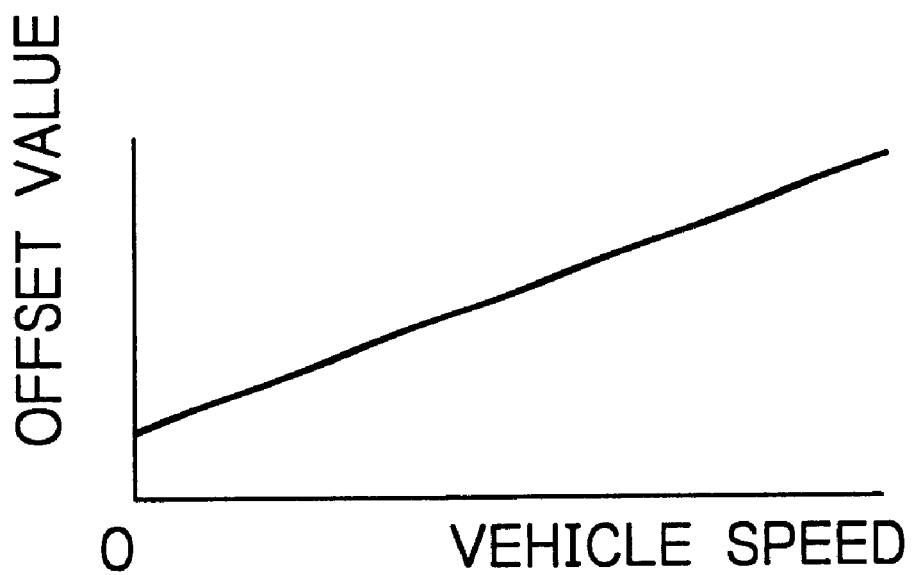
FIG. 7 is a graphic representation showing the relationship between vehicle speed and offset value used in the offset control subroutine shown in FIG. 6.

Since an intentional bump has a fixed length, it is necessary to effect offset control only while the vehicle travels over such a fixed length. A reference time can thus be shortened as vehicle speed increases. To this end, in the offset control subroutine shown in FIG. 6, an offset time is obtained by dividing a reference time by vehicle speed detected by the vehicle speed sensor 9 (step S31). It is to be noted that the faster the vehicle speed, the greater the vehicle movement as far as a vehicle travels over the same terrain. Based on this fact, a damping offset value (offset value) increases with vehicle speed as shown in FIG. 7 (step S32). Following this step, steps S21 to S29 shown in FIG. 4 are executed.

As in the first embodiment, in the second embodiment, at least the offset value or reference damping force is used as a final output (see FIG. 5). This control ensures proper dampening when a vehicle passes over a bump. Also, this final output is available within a predetermined time period (or reference time). This is made possible by setting the offset value at "0" when the step S23 (a determination as to whether the offset value is less than the reference time) is answered in the negative (step S25). This control minimizes deterioration in ride quality which may occur as a damping force increases and thus, achieves control over dampening performance. Additionally, this control makes it possible to adjust the reference time in response to vehicle speed and achieves more accurate control over dampening performance in response to the vehicle speed.

Figure 8:
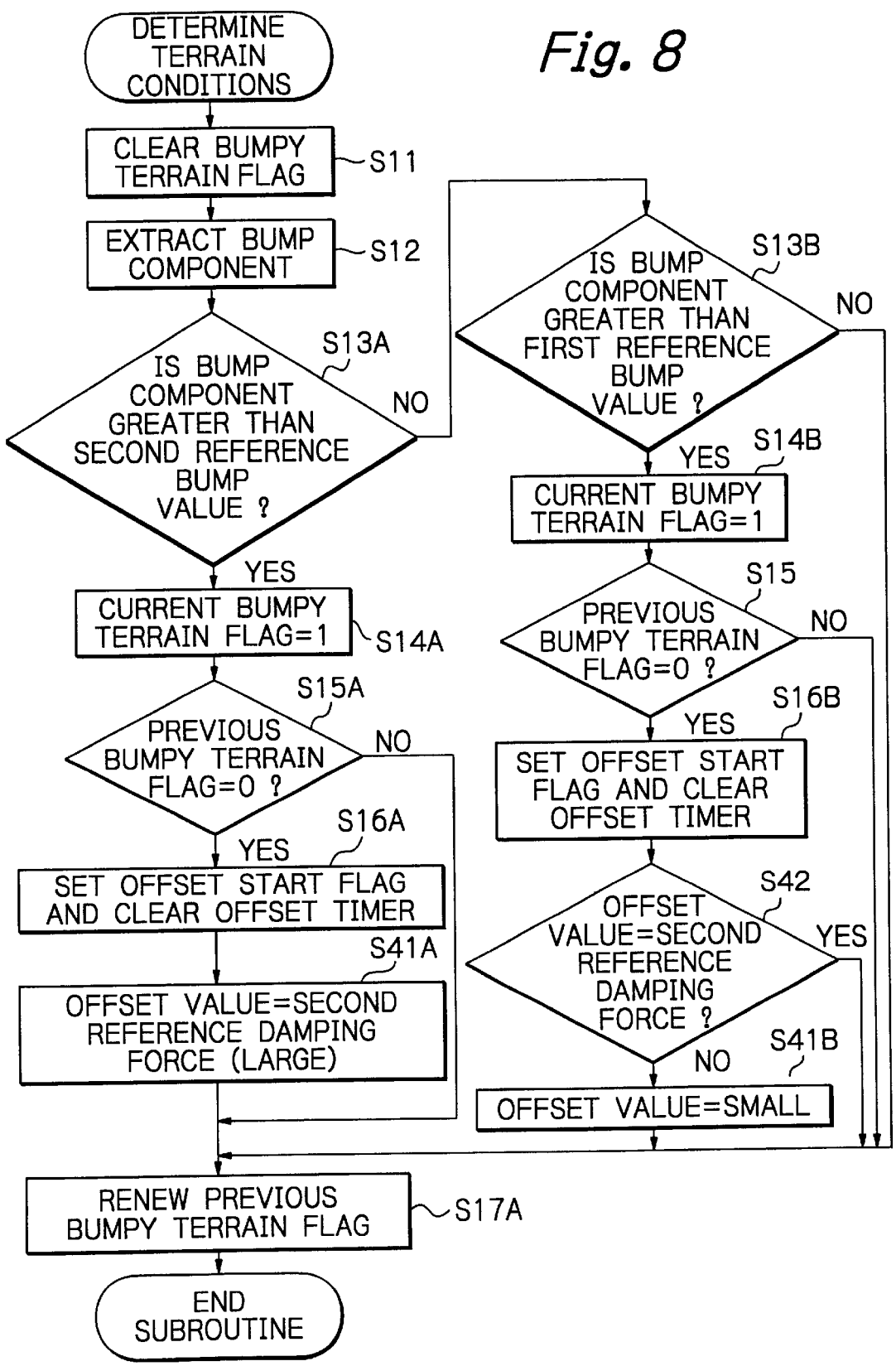
FIG. 8 is a flowchart showing another form of the terrain condition determination subroutine shown in FIG. 2 (third embodiment of the present invention)

The terrain condition determination subroutine shown in FIG. 3 and included in;step S7 shown in FIG. 2 may be replaced by that shown in FIG. 8. In a terrain condition determination subroutine (For purposes of illustration, a suspension control system that executes this subroutine will be referred to as a "third embodiment") shown in FIG. 8, two reference bump values (A first reference bump value is less than a second reference bump value) are compared with the amplitude in a bump component. These two reference bump values are used to determine two types of terrain conditions (gradual bump and steep bump). First and second reference damping forces (The first reference damping force is less than the second reference damping force) are used as offset values. In the third embodiment, the main routine is executed in a manner as shown in FIG. 2, and the offset control subroutine is executed in a manner as shown in FIG. 4.

More specifically, in the terrain condition determination subroutine shown in FIG. 8, after execution of steps S11 and S12 shown in FIG. 3, a determination is made as to whether the amplitude in the bump component as extracted in step S12 is greater than the second reference bump value (step S13A). If the answer to this question is "YES" (that is, when the amplitude in the bump component is greater than the second reference bump value), then steps S14A to S16A are executed, as in steps S14 to S16. Following step S16A, the second reference damping force is used as an offset value (minimum damping force) (step S41A). If, on the other hand, step S13A is answered in the negative (that is, when the amplitude in the bump component is less than the second reference bump value), then a determination is made as to whether the amplitude is greater than the first reference bump value (step S13B). If the answer to this question is "YES" (that is, when the amplitude is greater than the first reference bump value), then steps S14B to S16B are executed, as in steps S14 to S16. Following step S16B, a determination is made as to whether the offset value (minimum damping force) is equal to the second reference damping force (step S42). If the answer to this question is "NO" (that is, when the offset value (minimum damping force) is different from the second reference damping force), the offset value is made equal to the first reference damping force (step S41B). If step S15A, step S13B or step S15B is answered in the negative, if step S42 is answered in the positive, or after steps S41A or A41B are executed, the previous bumpy terrain flag is renewed (step S17A). This completes the subroutine.

In the third embodiment, when it is determined (step S13A) that the amplitude in a bump component is less than the second reference bump value (The first reference bump value is less than the second reference bump value), a further determination is made as to whether the amplitude is greater than the first reference bump value (step S13B). This control makes it possible to determine two difference types of bumps (gradual bump and steep bump) based on the first and second reference bump values.

If the question in step S13A is answered in the positive (It is assumed that the vehicle passes over a steep bump), and the previous bumpy terrain flag is "0" (or when the question in step S15A is answered in the positive), the offset value is made equal to the second reference damping force (The second reference damping force is greater than the first reference damping force) (step S41A). This control increases the value of a final output sent to the actuator 7 and thereby, retards full extension (full rebound) and full compression (full bumping) of the suspension even if the bumpy terrain includes steep bumps.

If the question in step S13B is answered in the positive (It is assumed that the vehicle passes over a gradual bump), and the previous bumpy terrain flag is "0" (that is, when the question in step S15B is answered in the positive), the offset value is made equal to the first reference damping force (The second reference damping force is greater than the first reference damping force) (step S41B). A smaller final output is sent to the actuator 7 as compared to step S41A. This control achieves control over dampening performance when the vehicle passes over a gradual bump (The dampening performance can be achieved with a smaller damping force since full rebound and full bumping less occurs when a vehicle passes over a gradual bump than over a steep bump). Also, this control improves ride quality since the offset value is less than the offset value offered by the control when a vehicle passes over a steep bump (step S41A).

Figure 9:
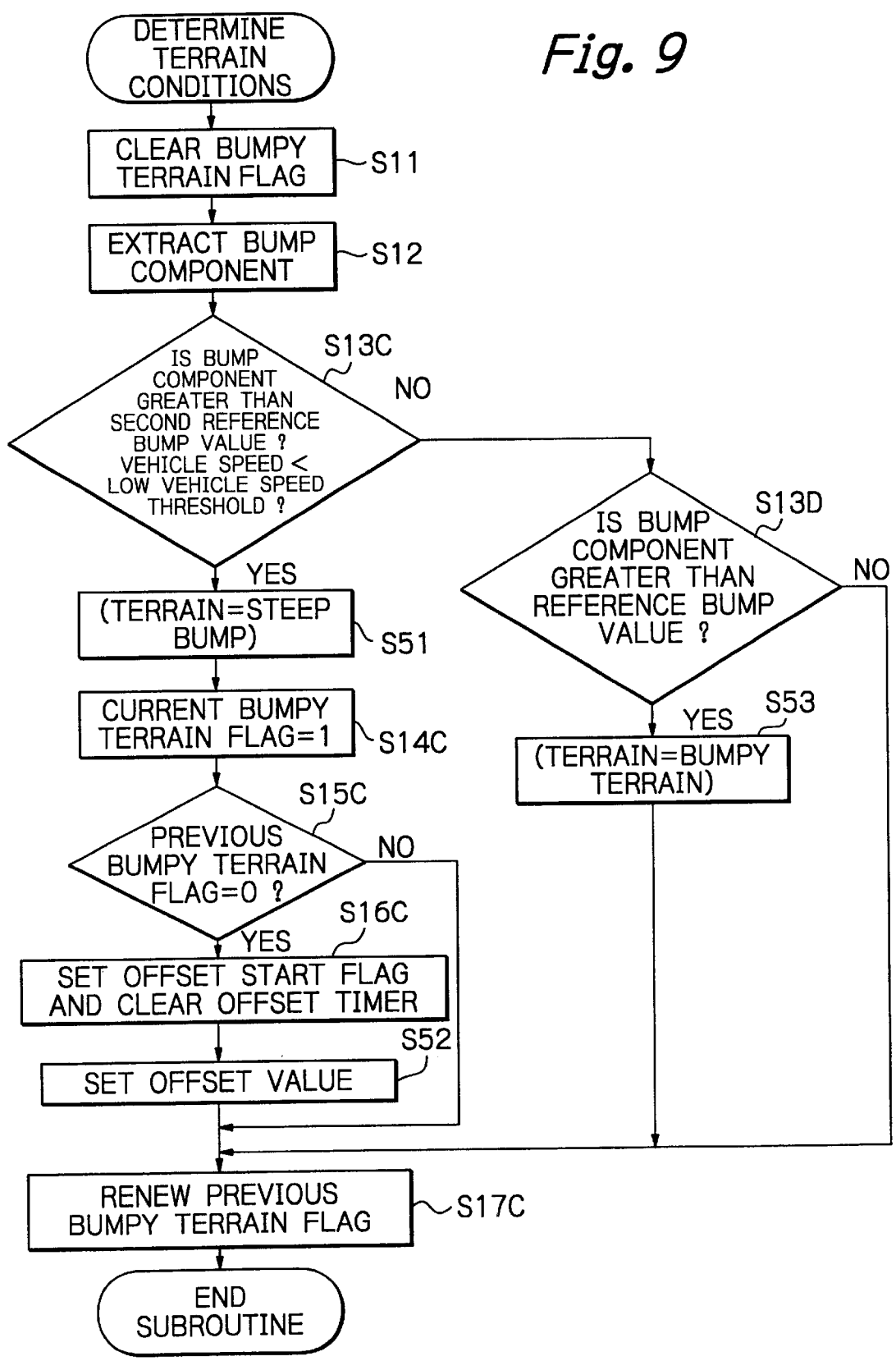
FIG. 9 is a flowchart showing still another form of the terrain condition determination subroutine shown in FIG. 2 (fourth embodiment of the present invention)
Figure 10:
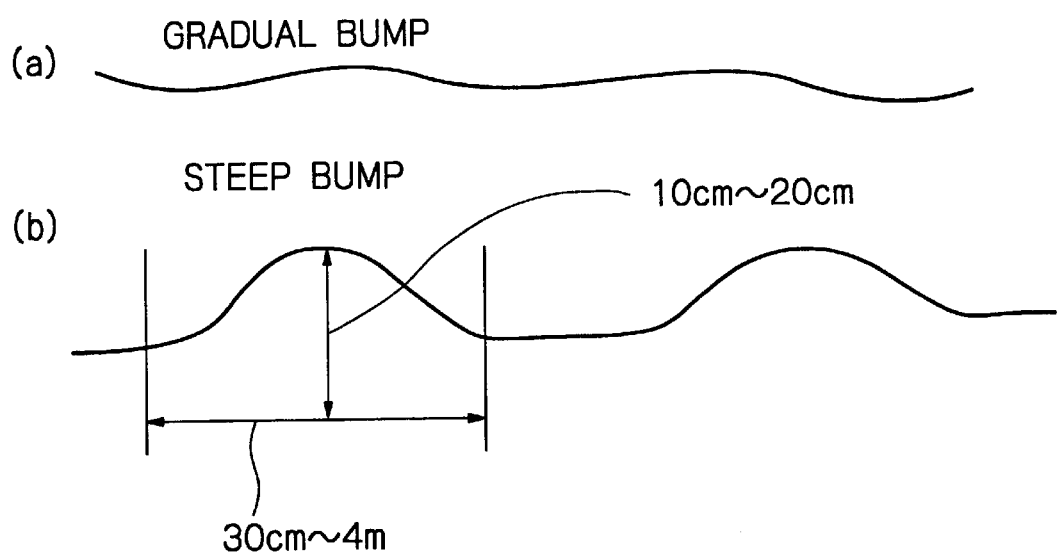
FIG. 10 is a schematic view showing terrain (gradual bump and steep bump)

The terrain condition determination subroutine shown in FIG. 3 and included in step S7 shown in FIG. 2 may be replaced by that shown in FIG. 9. In a terrain condition determination subroutine (For purposes of illustration, a suspension control system that executes this subroutine will be referred to as a "fourth embodiment") shown in FIG. 9, terrain is classified into two different types of bumps in response to the amount of vibration of the vehicle body above the spring. Also, this program detects vehicle speed. When the vehicle travels at a low speed with a large bump level, it is determined that a steep bump is encountered. When the vehicle travels at a high speed, it is determined that no steep bump is encountered, even if the vehicle body above the spring is vibrated to a great extent. The suspension control system of the fourth embodiment includes a vehicle speed sensor as a means for detecting vehicle speed. This vehicle speed sensor detects vehicle speed and develop a corresponding vehicle speed signal.

In the terrain condition determination subroutine shown in FIG. 9, after execution of steps S11 and S12, a determination is made as to whether the value of amplitude extracted from the bump component in step S12 is greater than the second reference bump value (corresponding to median value between large amplitude and medium amplitude), and vehicle speed detected by the vehicle sensor is less than a low vehicle speed threshold (step S13C). If the answer to this question is "YES", then the terrain is considered to be a steep bump (step S51). In step S13C, it is determined that no steep bump is encountered (The question in step S13C is answered in the positive) if the amplitude is greater than the second reference bump value, but the vehicle travels at a high speed (The vehicle speed is greater than the low vehicle speed threshold) Following step S51, steps S14C to S16C are executed, as in steps S14 to S16 Following step S16C, an offset value is set at a predetermined damping force (in this instance, at the second reference damping force) (step S52). Thereafter, a previous bump terrain flag is cleared (step S17C). This completes the subroutine.

Figure 11:
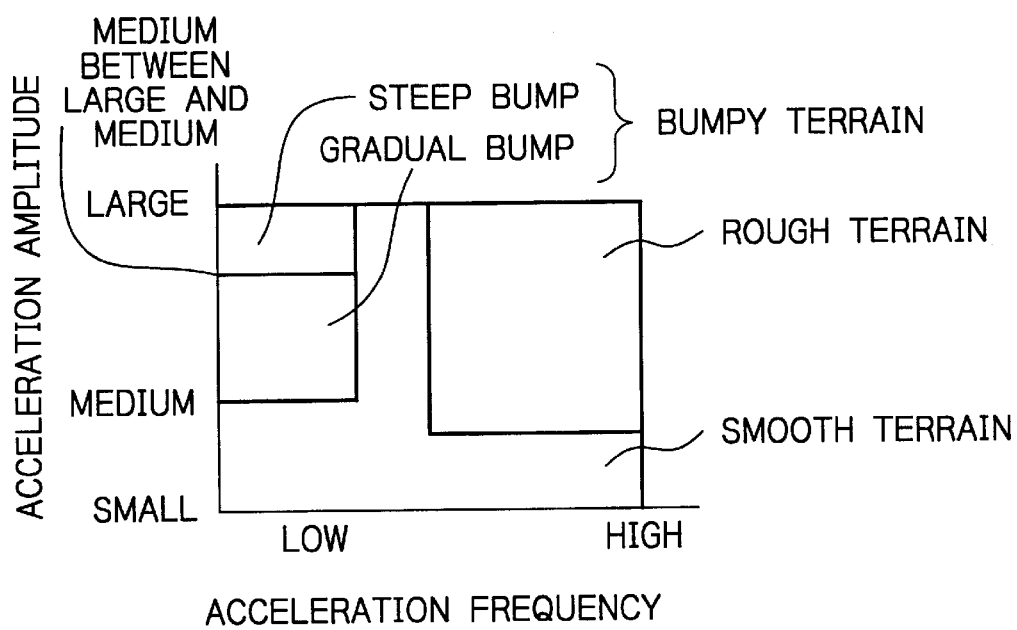
FIG. 11 is a schematic view showing terrain conditions classified based on acceleration frequency and acceleration amplitude (basis on which terrain conditions are determined when a vehicle travels at a low speed)
Figure 12:
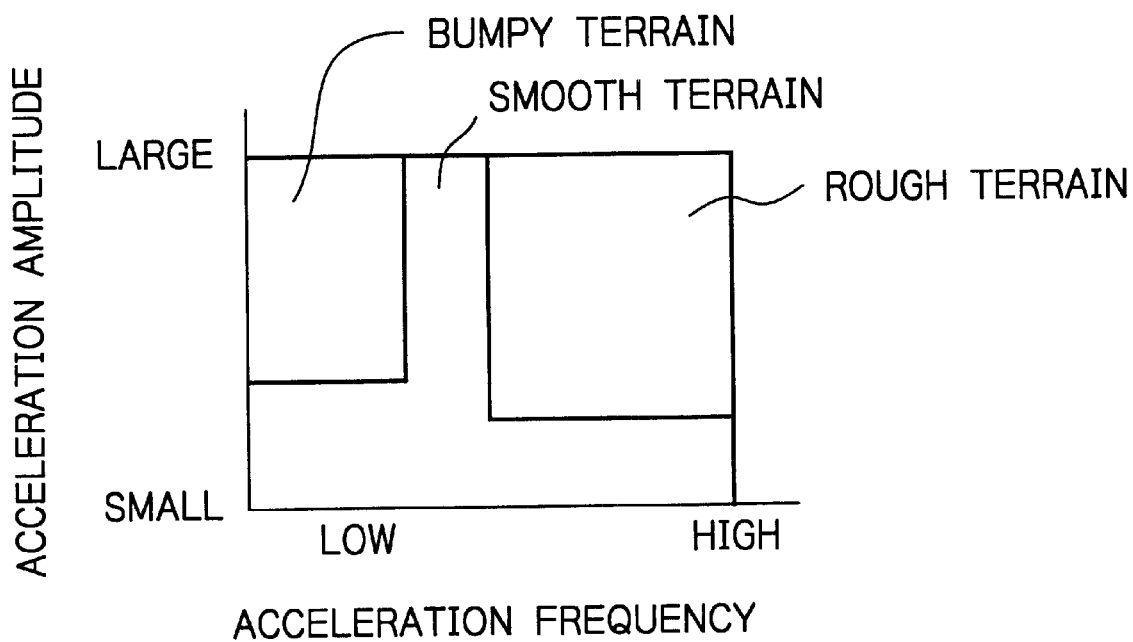
FIG. 12 is a schematic view showing the basis on which terrain conditions are determined when a vehicle travels at a high speed.

If the question in step S13C is answered in the negative (that is, when the amplitude is less than the second reference bump value or when the vehicle speed is greater than the low vehicle speed threshold), then a determination is made as to whether the amount of the amplitude is greater than the first reference bump value (step S13D). Again, it is determined that no steep bump is encountered when the vehicle travels at a high speed, even if the bump component has a large amplitude as shown in FIG. 12. On the other hand, it is determined (step S51) that a steep bump is encountered when the vehicle travels at a low speed (greater than the low vehicle speed threshold), and the amount of the amplitude is greater than the second reference bump value (corresponding to median value between large amplitude and medium amplitude) as shown in FIG. 11.

If the answer to the question in step S13D is "YES", it is determined that the terrain is bumpy. The program then proceeds to step S17C. If the answer to the question in step S15C is "NO" or if the answer to the question in step S13D is "NO", or after steps S52 and S53 are executed, the program proceeds to step S17C.

In the fourth embodiment thus far described, a determination is made as to whether the amplitude in a bump component is greater than the second reference bump value, and the vehicle speed sensed by the vehicle sensor is less than the low vehicle speed threshold. If the answer to this question is "YES", it is determined that a steep bump is encountered (step S51). If "NO", it is determined that a gradual bump is encountered (step S53). This program is capable of determining two different types of bumps (gradual bump and steep bump). Also, if the question in step S13C is answered "YES" (when it is determined that a steep bump is encountered), the offset value is set at the second reference damping force, provided that the previous bumpy terrain flag is "0" (that is, when the question in step S15C is answered in the positive). As a result, a larger final output is sent to the actuator 7. This program thus retards full extension (full rebound) and full compression (full bumping) of the suspension if terrain encountered includes steep bumps.

What is claimed is:

1. A suspension control system for use with a vehicle having a body, a wheel axle and a wheel on the wheel axle, said suspension control system comprising:

a shock absorber adapted to be mounted between the vehicle body and the wheel axle, said shock absorber being operable to develop a variable damping force;

an actuator operatively connected to said shock absorber and adapted to adjust the damping force;

a vehicle speed sensor operable to detect a vehicle speed and develop a corresponding vehicle speed signal; and a controller operable to receive the vehicle speed signal from said vehicle speed sensor, said controller including means for determining terrain conditions, said means for determining terrain conditions being operable to determine that a steep bump is encountered when the vehicle speed as detected is less than a low vehicle speed threshold, wherein said controller is operable to activate said actuator to increase the damping force by a predetermined amount for a predetermined period of time when said means for determining terrain conditions determines that a steep bump is encountered.

2. A suspension control system according to claim 1, wherein said controller is operable to vary at least one of an applied amount of the increased damping force and an applied time of the increased damping force when said means for determining terrain conditions determines that a steep bump is encountered.

3. A suspension control system according to claim 2, further comprising means for detecting terrain conditions, connected to said controller and adapted to develop a terrain condition signal in response to terrain conditions, wherein the damping force is increased by an amount greater than the predetermined amount when the terrain condition signal has a frequency that is less than a predetermined frequency and an amplitude that is greater than a predetermined amplitude.

4. A suspension control system according to claim 3, wherein said means for detecting terrain conditions comprises an accelerometer for detecting vertical acceleration of the vehicle body.

5. A suspension control system according to claim 2, further comprising an accelerometer connected to said controller and adapted to develop a terrain condition signal in response to terrain conditions, wherein the damping force is increased by an amount greater than the predetermined amount when the terrain condition signal has a frequency that is less than a predetermined frequency and an amplitude that is greater than a predetermined amplitude.

6. A vehicle comprising:

a body;

a wheel axle;

a wheel on said wheel axle; and a suspension control system according to claim 1.

* * * * *